United States Patent [19]
Rockstroh et al.

[11] Patent Number: 6,005,219
[45] Date of Patent: Dec. 21, 1999

[54] RIPSTOP LASER SHOCK PEENING

[75] Inventors: Todd J. Rockstroh, Maineville; P. Kennard Wright, III, Cincinnati, both of Ohio

[73] Assignee: General Electric Company, Cincinnati, Ohio

[21] Appl. No.: 08/993,197

[22] Filed: Dec. 18, 1997

[51] Int. Cl.$^6$ ........................................ B23K 26/00
[52] U.S. Cl. ................ 219/121.85; 148/525; 219/121.84
[58] Field of Search ..................... 219/121.65, 121.66, 219/121.68, 121.69, 121.84, 121.85; 148/515, 525, 565

[56] References Cited

U.S. PATENT DOCUMENTS

| | | |
|---|---|---|
| 3,576,070 | 4/1971 | Parsons . |
| 4,002,403 | 1/1977 | Mallozzi et al. . |
| 4,060,769 | 11/1977 | Mallozzi et al. . |
| 4,401,477 | 8/1983 | Clauer et al. . |
| 4,411,730 | 10/1983 | Fishter et al. . |
| 4,426,867 | 1/1984 | Neal et al. . |
| 4,539,461 | 9/1985 | Benedict et al. . |
| 4,645,547 | 2/1987 | Krause et al. . |
| 4,708,752 | 11/1987 | Kar . |
| 4,937,421 | 6/1990 | Ortiz, Jr. et al. . |
| 4,972,061 | 11/1990 | Duley et al. . |
| 5,120,197 | 6/1992 | Brooks . |
| 5,127,019 | 6/1992 | Epstein et al. . |
| 5,131,957 | 7/1992 | Epstein et al. . |
| 5,235,838 | 8/1993 | Berstein . |
| 5,306,360 | 4/1994 | Bharti et al. . |
| 5,316,720 | 5/1994 | Spiegel et al. . |
| 5,492,447 | 2/1996 | Mannava et al. . |
| 5,571,575 | 11/1996 | Takayanagi . |
| 5,744,781 | 4/1998 | Yeaton ............................... 219/121.84 |
| 5,756,965 | 5/1998 | Mannava ............................ 219/121.84 |
| 5,911,891 | 6/1999 | Dulaney et al. .................... 219/121.85 |

OTHER PUBLICATIONS

American Machinist, "Laser Shocking Extends Fatigue Life", by John A. Vaccari, pp. 62–64, Jul., 1992.
Materials and Processing Report, "Laser Shock Processing Increases the Fatigue Life of Metal Parts", pp. 3–5, Sep., 1991.

*Primary Examiner*—Geoffrey S. Evans
*Attorney, Agent, or Firm*—Andrew C. Hess; Gerry S. Gressel

[57] ABSTRACT

A method of laser shock peening a hard metallic article by firing a laser beam on different points of a laser shock peened surface of at least a portion of the article using a laser beam with sufficient power to vaporize material on the surface around laser beam spots formed by the laser beam at the points on the surface, flowing a curtain of water over the surface upon which the laser beam is firing, and firing the laser beam so as to form a plurality of volumetrically spaced apart laser shock peened protrusions extending into the article from the spots such that the protrusions have deep compressive residual stresses imparted by laser the laser beam. The surface may first be coated with an ablative material which the laser beam vaporizes and the method may be an on the fly method of laser shock peening which further includes continuously moving the article while continuously firing a stationary laser beam which repeatably pulses between relatively constant periods.

14 Claims, 5 Drawing Sheets

RIPSTOP LASER SHOCK PEENING

RELATED PATENT APPLICATIONS

The present Application deals with related subject matter in U.S. patent application Ser. Nos.: 08/993,194, pending, entitled "LASER SHOCK PEENING USING LOW ENERGY LASER"; 08/362,362, "ON THE FLY LASER SHOCK PEENING", filed Dec. 22, 1994, now abandoned; and U.S. Pat. No. : 5,591,009, entitled "Laser shock peened gas turbine engine fan blade edges"; U.S. Pat. No. 5,569,018, entitled "Technique to prevent or divert cracks"; U.S. Pat. No. 5,531,570, entitled "Distortion control for laser shock peened gas turbine engine compressor blade edges"; U.S. Pat. No. 5,492,447, entitled "Laser shock peened rotor components for turbomachinery"; U.S. Pat. No. 5,674,329, entitled "Adhesive tape covered laser shock peening"; and U.S. Pat. No. 5,674,328, entitled "Dry tape covered laser shock peening", all of which are assigned to the present Assignee.

BACKGROUND OF THE INVENTION

1. Field of the Invention

This invention relates to laser shock peened articles and a method of laser shock peening, more particularly, for producing a laser shock peened ripstop array of non-overlapping spaced apart laser shock peened spots having localized compressive residual stresses imparted by laser shock peening.

2. Description of Related Art

Gas turbine engines and, in particular, aircraft gas turbine engines rotors operate at high rotational speeds that produce high tensile and vibratory stress fields within the blade and make the fan blades susceptible to foreign article damage (FOD). Vibrations may also be caused by vane wakes and inlet pressure distortions as well as other aerodynamic phenomena. This FOD causes nicks and tears and hence stress concentrations in leading and trailing edges of fan blade airfoils. These nicks and tears become the source of high stress concentrations or stress risers and severely limit the life of these blades due to High Cycle Fatigue (HCF) from vibratory stresses.

Therefore, it is highly desirable to design and construct longer lasting fan and compressor blades, as well as other hard metallic parts, that are better able to resist both low and high cycle fatigue and that can arrest cracks than present day parts. The above referenced U.S. Patent Applications are directed towards this end. They teach to provide an airfoil of a fan blade with a continuous or volumetric region of deep compressive residual stresses imparted by laser shock peening over at least an inwardly extending portion of laser shock peened surfaces of an article such as the fan blade. These regions are formed by multiple overlapping protrusions of compressive residual stresses imparted by laser shock peening that extend inward from overlapping laser shock peened circles or spots.

The deep compressive residual stresses imparted by laser shock peening of the present invention is not to be confused with a surface layer zone of a work piece that contains locally bounded compressive residual stresses that are induced by a hardening operation using a laser beam to locally heat and thereby harden the work piece such as that which is disclosed in U.S. Pat. No. 5,235,838, entitled "Method and apparatus for truing or straightening out of true work pieces". The prior art teaches the use of multiple radiation pulses from high powered pulsed lasers and large laser spot diameters of about 1 cm to produce shock waves on the surface of a work piece similar like the above referenced Patent Applications and U.S. Pat. No. 3,850,698, entitled "Altering Material Properties"; U.S. Pat. No. 4,401,477, entitled "Laser shock processing"; and U.S. Pat. No. 5,131,957, entitled "Material Properties". Laser shock peening as understood in the art and as used herein, means utilizing a laser beam from a laser beam source to produce a continuous region of strong compressive residual stresses in a continuous region on a portion of a surface. The region is volumetric and produced by the coalescence of individual protrusions extending inward from overlapping laser shock peened circles or spots. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". Manufacturing costs of the laser shock peening process is a great area of concern because startup and operation costs can be very expensive. The "on the fly" laser shock peening process disclosed in 08/362,362, above is designed to provide cost saving methods for laser shock peening as is the present invention. Prior art teaches to use large laser spots, on the order of 1 cm and greater in diameter, and high powered lasers. Manufacturers are constantly seeking methods to reduce the time, cost, and complexity of such processes. A laser shock peening method that uses a low power laser beam, on the order of 3–10 joules, with a preferred range of 3–7 Joules and laser beam spots having a diameter of about 1 mm is disclosed in co-pending U.S. patent application No. 08/993,194, entitled "LASER SHOCK PEENING USING LOW ENERGY LASER" and this method is directed to reducing time, cost, and complexity of laser shock peening. There is an ever present desire to design techniques that result in such reductions and to this end the present invention is directed.

SUMMARY OF THE INVENTION

The present invention provides a metallic article with at least one laser shock peened surface on at least a portion of the article and a plurality of volumetrically spaced apart laser shock peened protrusions extending into the article from said laser shock peened surface wherein the protrusions have deep compressive residual stresses imparted by laser shock peening (LSP). The invention may further include spaced apart circular laser beam spots on the surface from which the laser shock peened protrusions extend into the article such that the spots do not overlap. The protrusions typically have decreasing cross-sectional area in a direction inward from the spots. The plurality preferably includes at least one array of protrusions with equidistantly spaced apart circular laser beam spots.

The present invention includes a method of laser shock peening a hard metallic article by firing a laser beam on different points of a laser shock peened surface of at least a portion of the article using a laser beam with sufficient power to vaporize material on the surface around laser beam spots formed by the laser beam at the points on the surface, flowing a curtain of water over the surface upon which the laser beam is firing, and firing the laser beam so as to form a plurality of volumetrically spaced apart laser shock peened protrusions extending into the article from the spots such that the protrusions have deep compressive residual stresses imparted by laser the laser beam. The surface may first be coated with an ablative material which the laser beam vaporizes. The method may be an on the fly method of laser shock peening which further includes continuously moving the article while continuously firing a stationary laser beam which repeatably pulses between relatively constant periods.

One particular method of the present invention uses a low power laser beam having a power of about between 3–10 joules and forms laser beam spots having a diameter of about 1 mm. A temporal profile of each pulse may have a duration in a range of about 20 to 30 nanoseconds and a rise time less than about 10 nanoseconds. In a yet more particular embodiment of the present invention, the rise time is about 4 nanoseconds and the power of the laser is about 3 joules.

The method is used on a gas turbine engine blade having a leading edge and a trailing edge, the portion of the article is one of the edges, and the laser shock peened surface extends radially along at least a part of one of the edges.

The method may include simultaneously laser shock peening two laser shock peened surfaces, each of which is on one of two sides of the blade, and continuously moving the blade while continuously firing two stationary laser beams on the portion of the blade. This embodiment further includes using the laser beams to vaporize material on the two surfaces of the portion of the part with the pulses around the laser beam spots formed by the laser beam on the surfaces to form protrusions having deep compressive residual stresses extending into the blade from the laser shock peened surfaces and flowing a curtain of water over the surfaces upon which the laser beam is firing while moving the blade. The blade may be moved linearly to produce at least one row of non-overlapping equidistantly spaced apart circular laser beam spots having generally equally spaced apart linearly aligned center points. The blade may further be moved and the laser beam fired to produce more than one row of the circular laser beam spots having generally equally spaced apart linearly aligned center points wherein adjacent rows of spots do not overlap. The laser beams may be fired and the blade moved so that the center points of adjacent spots in adjacent rows are offset from each other a generally equal amount in a direction along a line on which the center points are linearly aligned. An Excimer type laser which use a gaseous medium that lase in the ultraviolet regime may be used.

ADVANTAGES

The present invention provides the advantage of not having to fully laser shock peen an entire surface to protect the region below the surface from failure due to fatigue induced cracking. The present invention provides the advantage of arresting incipient cracks before they can cause a failure due to fatigue cracking with a great deal less laser shock peening than was previously taught. Among the advantages provided by the present invention is a faster and more cost efficient method to laser shock peen surfaces of portions of gas turbine engine parts and in particular blades designed to operate in high tensile and vibratory stress fields which can better withstand fatigue failure due to nicks and tears in the leading and trailing edges of the fan blade and have an increased life over conventionally constructed fan blades. A laser shock peening production line may be set up less expensively as compared to those suggested in the prior art, due to lower capital outlay, and the line should be less complex to develop, design, and construct because the method of the present invention uses low powered lasers. Another advantage of the present invention is that fan and compressor blades can be constructed with cost efficient methods to provide commercially acceptable life spans without increasing thicknesses along the leading and trailing edges, as is conventionally done. The present invention can be advantageously used to refurbish existing fan and compressor blades with a low cost method for providing safe and reliable operation of older gas turbine engine fan blades while avoiding expensive redesign efforts or frequent replacement of suspect fan blades as is now often done or required.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
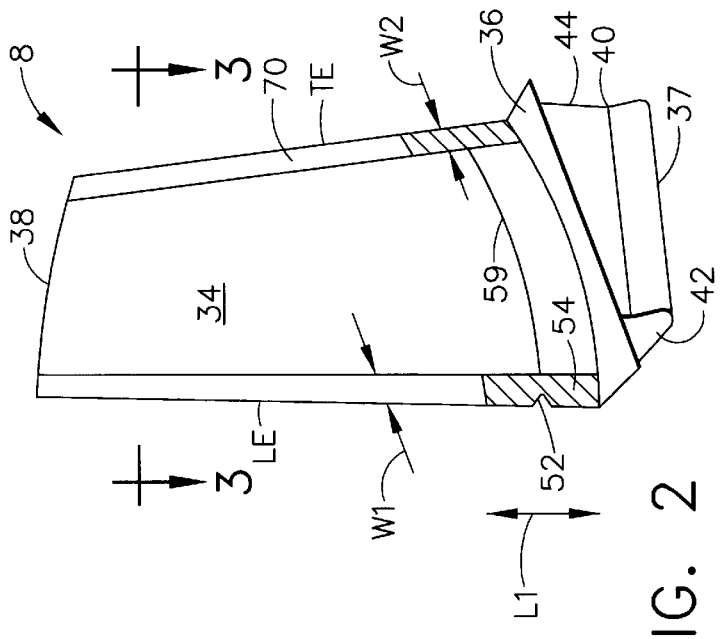
FIG. 1 is a perspective illustrative view of an exemplary aircraft gas turbine engine fan blade laser shock peened in accordance with a method of the present invention.
Figure 2:
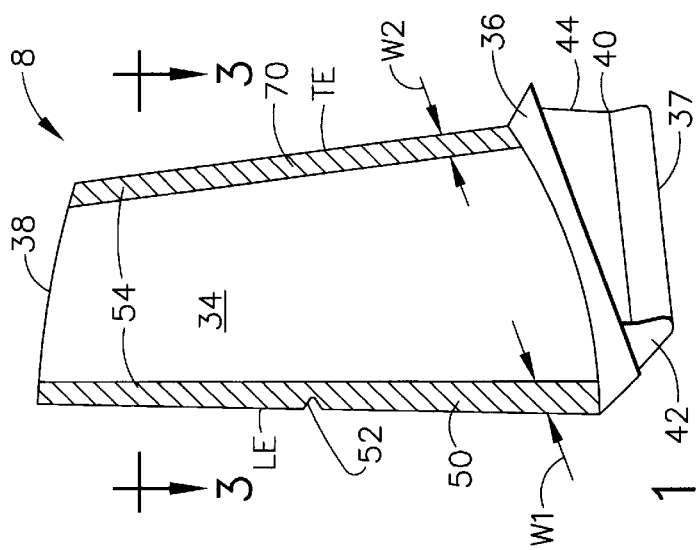
FIG. 2 is a perspective illustrative view of an alternative aircraft gas turbine engine fan blade including a laser shock peened radially extending portion of the leading edge in accordance with the present invention.
Figure 3:
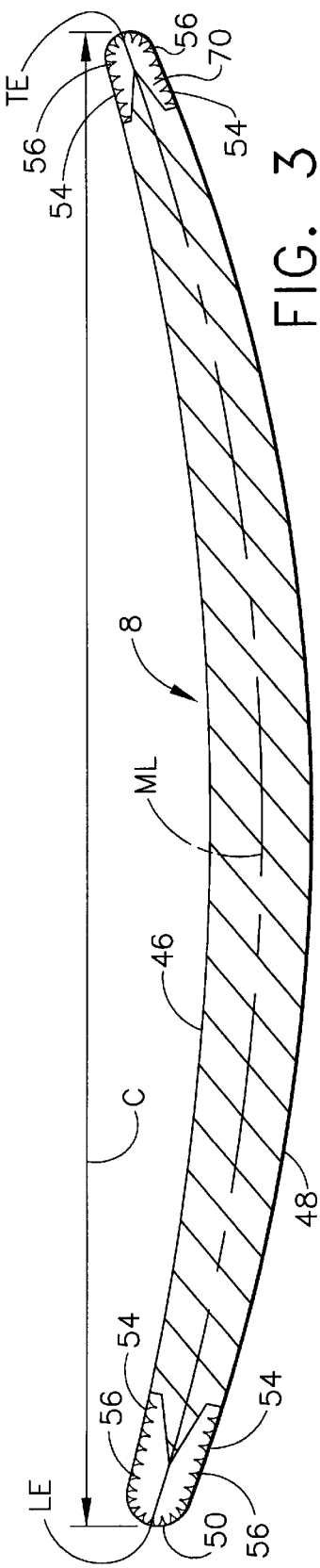
FIG. 3 is a cross sectional view through the fan blade taken along line 3—3 as illustrated in FIG. 2.

Illustrated in FIGS. 1, 2 and 3, is a fan blade 8 having an airfoil 34 made of a Titanium alloy extending radially outward from a blade platform 36 to a blade tip 38. This is representative of the type of hard metallic part and material that the article and the method of the present invention was developed for. The fan blade 8 includes a root section 40 extending radially inward from the platform 36 to a radially inward end 37 of the root section 40. At the radially inward end 37 of the root section 40 is a blade root 42 which is connected to the platform 36 by a blade shank 44. The airfoil 34 extends in the chordwise direction between a leading edge LE and a trailing edge TE of the airfoil. A chord C of the airfoil 34 is the line between the leading LE and trailing edge TE at each cross section of the blade as illustrated in FIG. 2. A pressure side 46 of the airfoil 34 faces in the general direction of rotation as indicated by the arrow and a suction side 48 is on the other side of the airfoil and a mean-line ML is generally disposed midway between the two faces in the chordwise direction.

The fan blade 8 has a leading edge section 50 that extends along the leading edge LE of the airfoil 34 from the blade platform 36 to the blade tip 38. The leading edge section 50 includes a predetermined first width W1 such that the leading edge section 50 encompasses nicks 52 and tears that may occur along the leading edge of the airfoil 34. The airfoil 34 subject to a significant tensile stress field due to centrifugal forces generated by the fan blade 8 rotating during engine operation. The airfoil 34 is also subject to vibrations generated during engine operation and the nicks 52 and tears operate as high cycle fatigue stress risers producing additional stress concentrations around them.

Figure 4:
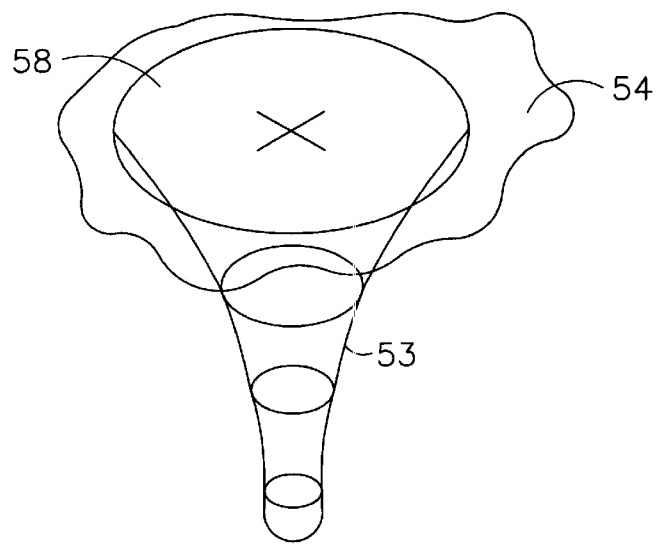
FIG. 4 is a perspective illustrative view of a laser shock peened protrusion extending inward from a laser shocked peened circular spot on a laser shock peened surface in accordance with a preferred embodiment of the present invention.
Figure 5:
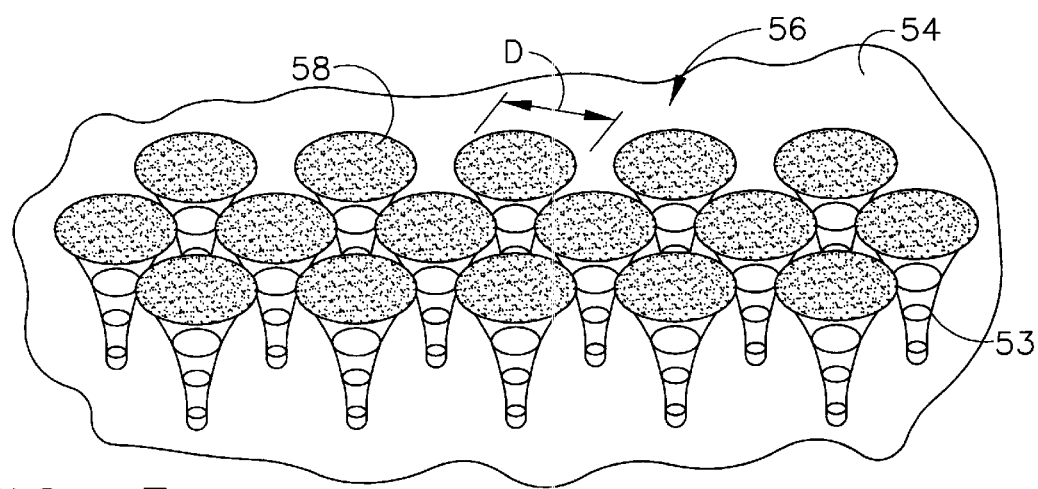
FIG. 5 is a schematic illustration of a particular pattern of volumetrically spaced apart laser shocked peened protrusions in accordance with a preferred embodiment of the present invention.
Figure 6:
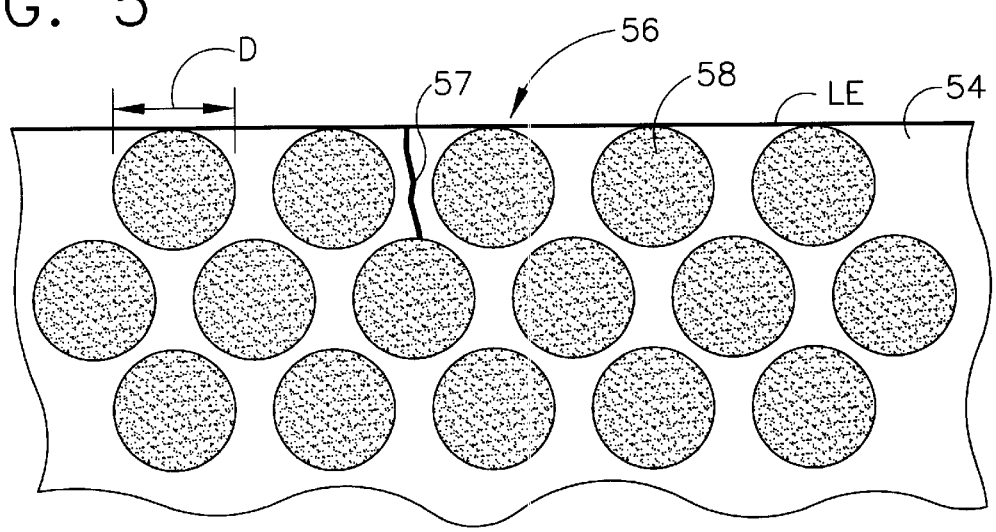
FIG. 6 is a top view of the laser shocked peened circular spots in FIG. 5.

To counter fatigue failure of portions of the blade along possible crack lines that can develop and emanate from incipient cracks or microcracks, nicks, and tears at least one and preferably both of the pressure side 46 and the suction side 48 have a laser shock peened surface 54 with arrays 56 of pre-stressed volumetrically spaced apart laser shock peened protrusions 53, referring to FIGS. 4–6, having deep compressive residual stresses imparted by a laser shock peening (LSP) method in accordance with the present invention. The array 56 of volumetrically spaced apart laser shock peened protrusions 53 forms has "rip stop" effect that is fully capable of stopping incipient cracks 57 from propagating past or around the individual the laser shock peened protrusions by literally arresting the crack. This eliminates the need for laser shock peening the entire laser shock peened surface 54 in order to completely fill and pre-stress the entire region in the article below the laser shock peened surface with compressive residual stresses.

Figure 6A:
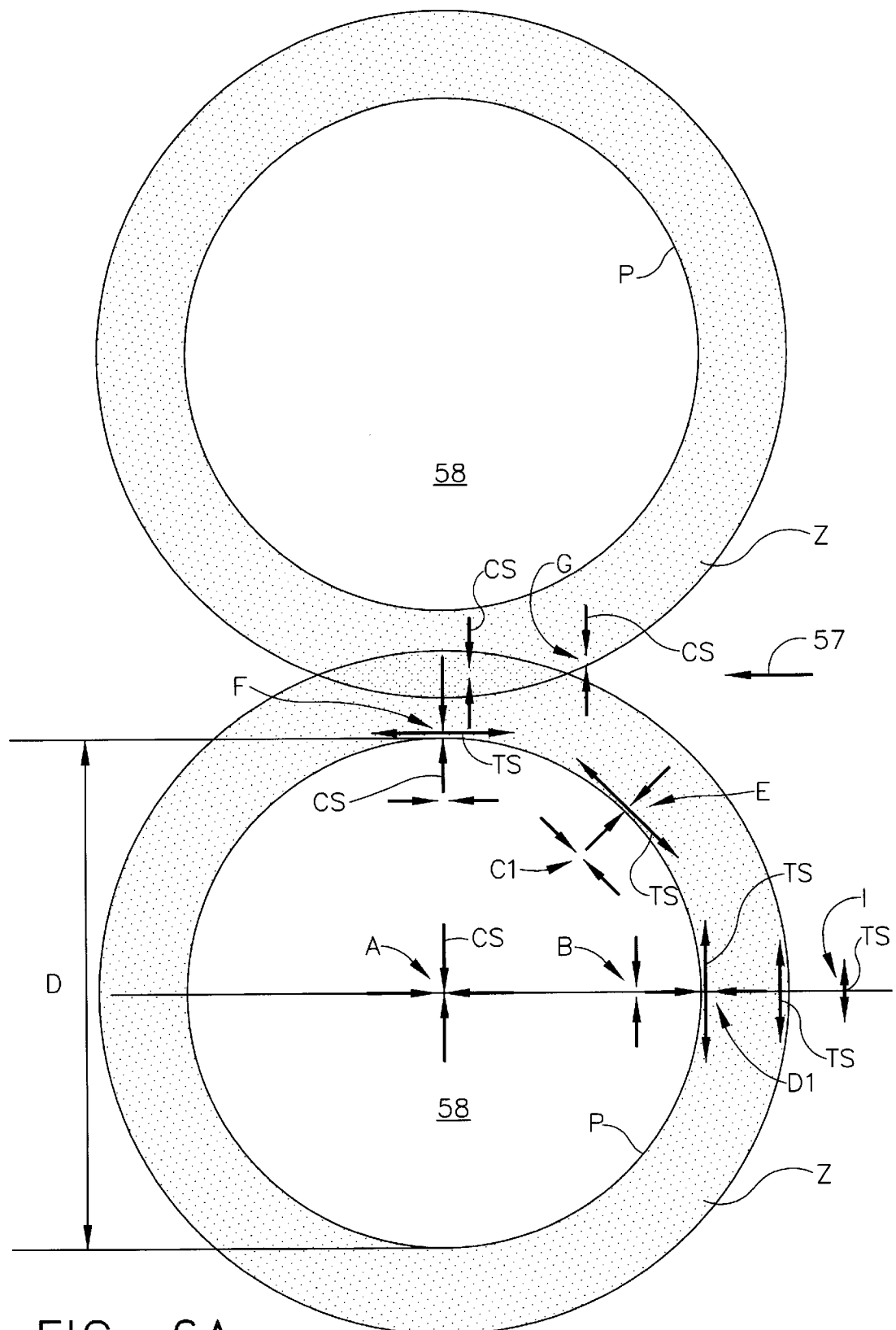
FIG. 6A is a schematic illustration of stress zones around two of the laser shocked peened circular spots in FIG. 6.

One reason the present invention is capable of stopping fatigue cracks even though the laser peened spots do not form a continuous overlapping pattern is because a compressive outer regions or zones Z of radial compressive stress around adjacent spots 58 extends out beyond a spot periphery P. The zones Z of radial compressive stress of adjacent spots 58 may even overlap as illustrated in the FIGS. This is illustrated in FIG. 6A, which shows two nearby spots 58 out of the array 56 in FIG. 6. The LSP process compresses the laser shock peened material inside the spot 58 forcing the laser shock peened material outward against the surrounding unpeened material, and creating a field of relatively uniform compression in all directions within the spot as illustrated at locations A, B, and C1 in FIG. 6A. Just beyond the boundary of the spot 58, at locations D1, E and F, the circumferential stresses become tensile stresses, denoted by arrows pointing away from each other and labeled TS, in order to balance the compressive stresses within the spot, but the radial stresses at the boundary at locations D1, E, and F remain compressive for some distance beyond the periphery P of the spot. Thus because the spots 58 are placed in proximity to either other, but not touching, there exists a zone Z between them in which the stress perpendicular to a growing crack 57 is compressive throughout as shown at locations F and G. Any crack 57 attempting to grow between the LSP spots 58 will encounter this zone Z of compression and be slowed or stopped. In addition, the tensile circumferential stresses TS around the individual spots will play a role in arresting cracks growing from right to left in FIG. 6A. The residual circumferential tensile stresses, as shown at D1 and E will tend to attract a crack growing from right to left and cause the crack path to deflect toward the center of the LSP spot. The closer to the spot, the stronger the attraction becomes, until the crack reaches the spot periphery P, where the sign of the circumferential residual stress rapidly changes from tension to compression, and the crack stops. Thus the tensile residual stresses around each individual spot help to deflect any fatigue crack off its normal path and into the regions of highest compression, where the effect of the spaced apart spots is greatest.

The present method preferably uses low power lasers having an output of about 3–10 joules focused to produce small diameter laser spots 58 having a diameter D in a range of about 1 mm (0.040 in.) to 2 mm (0.080 in.) on the laser shock peened surface as illustrated in FIGS. 5 and 6. This results in a surface laser energy density of approximately 400 Joules/cm$^2$ down to 100 Joules/cm$^2$, respectively. This creates the arrays 56 of pre-stressed protrusions 53 extending into the airfoil 34 from the laser shock peened surfaces as seen in FIGS. 3 and 5. A laser pulse temporal profile is preferably on the order of 20 to 30 nanoseconds in duration and the rise time preferably less than about 10 nanoseconds with a preferred amount of about 4 nanoseconds nominally. Shorter pulse temporal conditions have been found to enhance the LSP effect, producing compressive residual stresses deeper into the component. Satisfactory results have been demonstrated with a laser pulse temporal profile of approximately 45 nanoseconds in duration with a leading edge rise time of 24 nanoseconds. This temporal profile appears to be relatively long to effect LSP.

Nonetheless, low energy lasers, with relatively poor pulse temporal parameters, appear to produce compressive residual stress deep into the component. Compressive stress has been measured at 0.75 mm (0.030 in.) into the specimen treated with a low energy laser. This compares with the 0.254 mm (0.010 in.) limit of shot peering and the depths reported elsewhere for high energy lasers approaching 1.27 mm (0.050 in.) in depth. The penetration depth of a low energy laser can be improved when the leading edge temporal rise time is shortened which in turn also shortens the pulse duration as the sharper rise time initiates the blast wave faster and increases the blast wavefront energy and resulting pressure. It is expected that a 3 Joule laser used with a rise time of 5 nanoseconds can produce compressive stresses in excess of 1.27 mm (0.050 in.) into the metallic surface.

Larger lasers with greater power may be used as described in the above references. Preferably, the arrays 56 are coextensive with the leading edge section 50 in the chordwise direction to the full extent of width W1 and are deep enough into the airfoil 34 to arrest any crack 57 that may occur within at least a part of the width W1. The arrays 56 are shown coextensive with the leading edge section 50 in the radial direction along the leading edge LE but may be shorter. The laser beam shock induced deep compressive residual stresses in the laser shock peened protrusions 53 of the arrays 56 are generally about 50–150 KPSI (Kilo Pounds per Square Inch) and extend from the laser shocked surfaces 54 to a depth of about 20–50 mils into the article as represented by the airfoil 34. The laser beam shock induced deep compressive residual stresses may be produced by repetitively firing two high energy laser beams 2, each of which is defocused ± a few mils with respect to the surfaces 54 on both sides of the leading edge LE which are covered with an ablative coating 55 such as paint or tape as disclosed in U.S. Pat. Nos. 5,674,329 and 5,674,328. The array 56 of volumetrically spaced apart laser shock peened protrusions 53 is formed by spacing apart and not overlapping the laser shocked peened circular spots 58 as illustrated in FIGS. 5 and 6.

Figure 7:
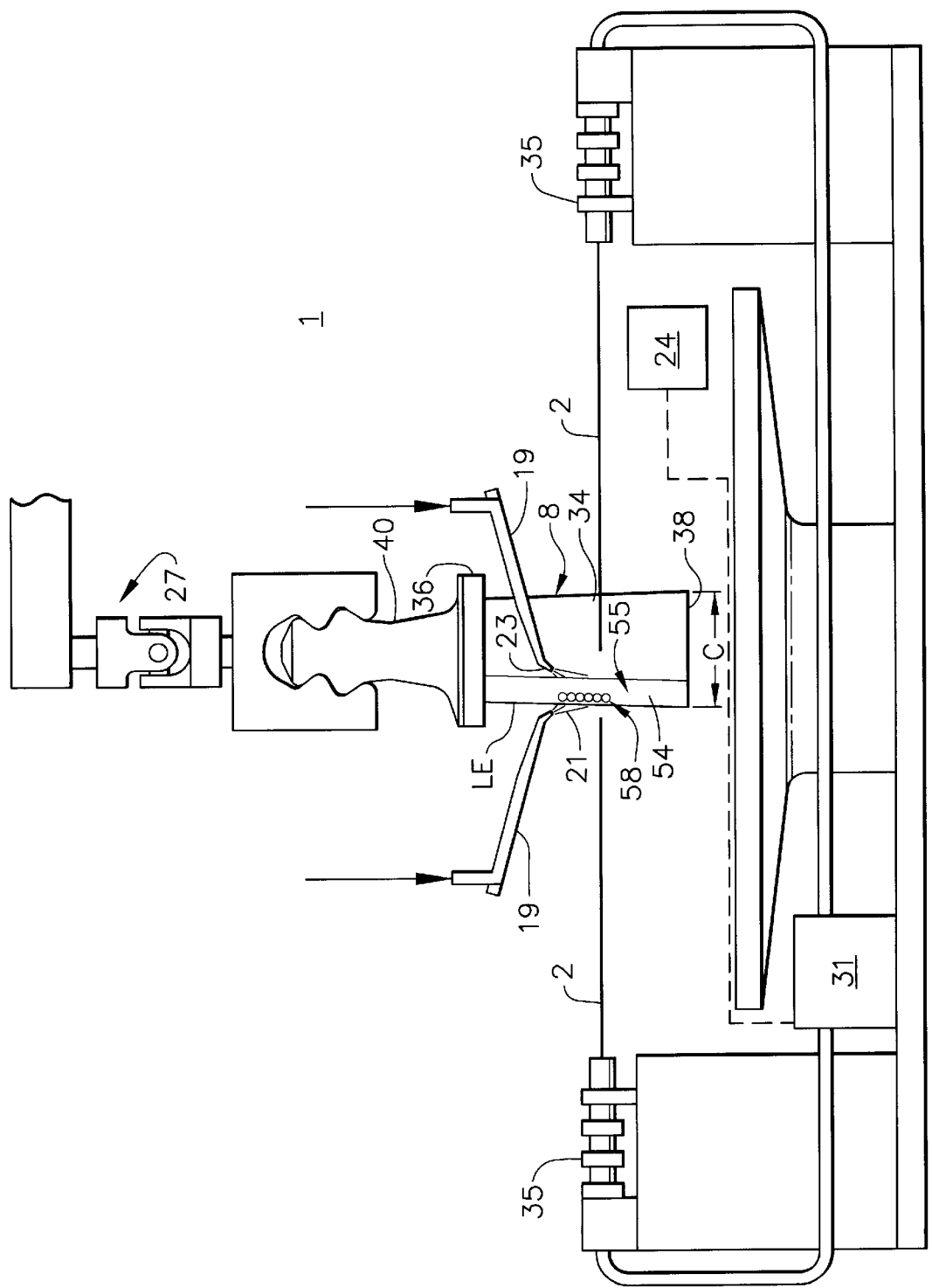
FIG. 7 is a schematical perspective view of the blade of FIG. 1 coated and mounted in a laser shock peening system illustrating the method of the present invention.
Figure 8:
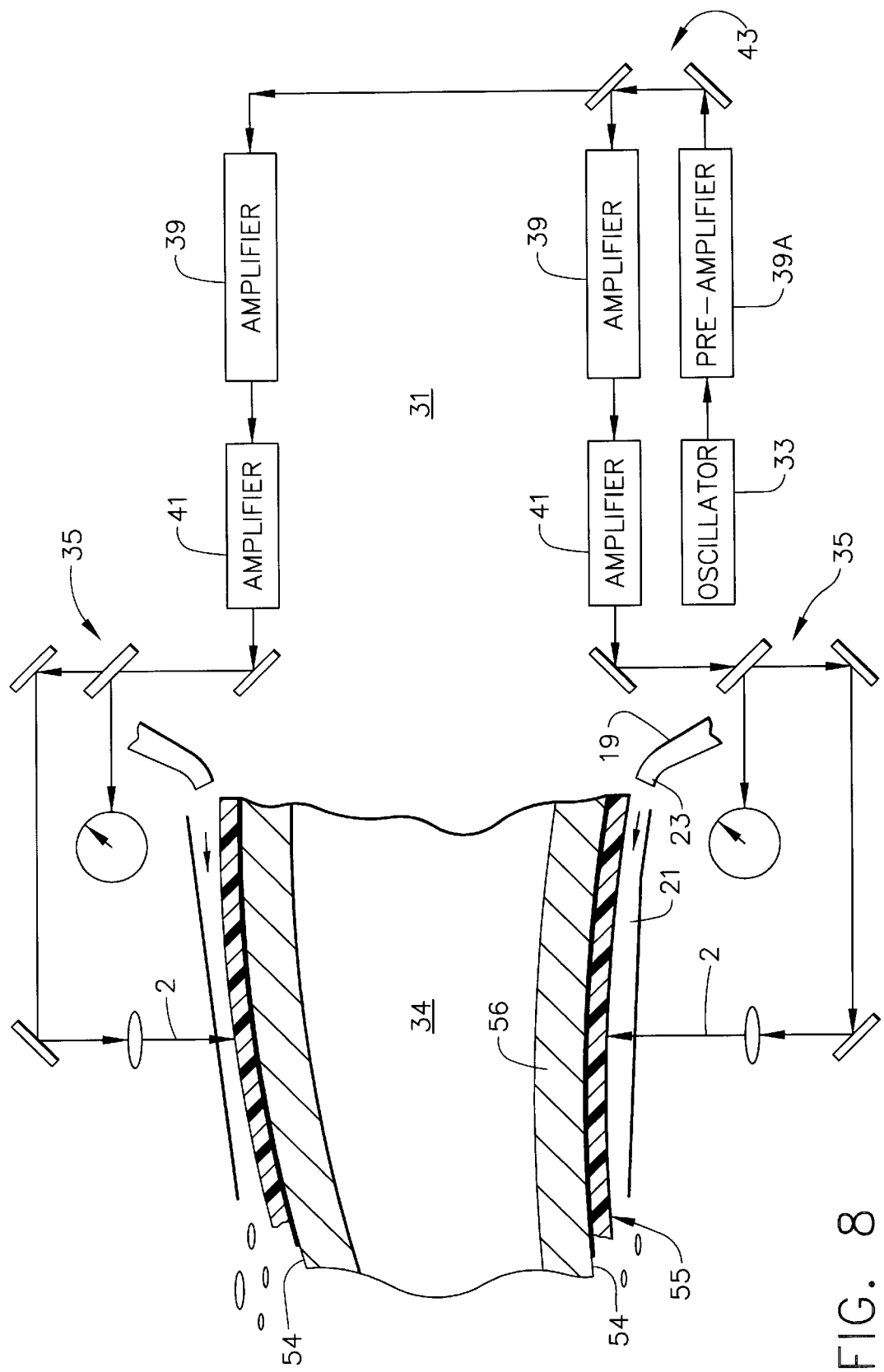
FIG. 8 is a partial cross-sectional and a partial schematic view of the setup in FIG. 7.

Referring to FIGS. 7 and 8, the laser beam shock induced deep compressive residual stresses are produced by repetitively firing two low energy laser beams 2, each of which is defocused ± a few mils with respect to the surfaces 54 on both sides of the leading edge LE which are covered with the ablative coating 55. The laser beam is preferably fired through a curtain of flowing water that is flowed over the coated laser shock peened surface 54. The paint, tape, or other ablative coating 55 is ablated generating plasma which results in shock waves on the surface of the material. Other ablative materials may used to coat the surface as suitable alternatives to paint. These coating materials include metallic foil or adhesive plastic tape as disclosed in U.S. Pat. No. 5,674,329 and 5,674,328. These shock waves are re-directed towards the coated surface by the curtain of flowing water to generate travelling shock waves (pressure waves) in the material below the coated surface. The amplitude and quantity of these shockwave determine the depth and intensity of compressive stresses. The ablative coating is used to protect the target surface and also to generate plasma. Illustrated in FIGS. 7 and 8 is an apparatus 1 which has the blade 8 mounted in a conventionally well known robotic arm 27 used to continuously move and position the blade to provide laser shock peening "on the fly" in accordance with one embodiment of the present invention. The laser shock peened surfaces 54 on both the pressure and suction sides 46 and 48, respectively of the leading edge LE are coated with the ablative coating 55. Then the blade 8 is continuously moved while continuously firing the stationary laser beams 2 through a curtain of flowing water 21 on the surfaces 54 and forming the spaced apart laser shock peened circular spots 58. The curtain of water 21 is illustrated as being supplied by a conventional water nozzle 23 at the end of a conventional water supply tube 19. The laser shock peening apparatus 1 has a conventional generator 31 with an oscillator 33 and a pre-amplifier 39A and a beam splitter 43 which feeds the pre-amplified laser beam into two beam optical transmission circuits each having a first and second amplifier 39 and 41, respectively, and optics 35 which include optical elements that transmit and focus the laser beam 2 on the laser shock peened surfaces 54. A controller 24 may be used to modulate and control the laser beam apparatus 1 to fire the laser beams 2 on the laser shock peened surfaces 54 in a controlled manner. Ablated coating material is washed out by the curtain of flowing water.

The laser may be fired sequentially "on the fly" so that the laser shock peened surface 54 is laser shock peened with more than one sequence of coating the surface and then laser shock peening the surface while continuously effecting movement between the airfoil 34 of blade 8 and the laser beams 2 as illustrated in FIGS. 7 and 8. In the illustrative embodiment herein, the airfoil 34 is moved while continuously firing the laser beams 2 on the surfaces 54 such that adjacent laser shock peened circular spots are hit in spaced apart non-overlapping positions hit. The sequence of coating and laser shock peening may be repeated several times to attain a desired strength of compressive residual stresses and depth of the laser shock peened protrusions 53.

FIGS. 5 and 6 illustrate the spaced apart laser shocked peened circular spots with the small diameters D in a range of about 1 mm (0.040 in.) to 2 mm (0.080 in.) in which their corresponding centers are spaced more than 1 diameter D and the row centerlines may be spaced slightly less than 1 diameter D apart such that none of the spots 58 overlap.

This method is designed so that only virgin or near virgin coating is ablated away without any appreciable effect or damage on the surface of the airfoil. This is to prevent even minor blemishes or remelt due to the laser which might otherwise cause unwanted aerodynamic effects on the blade's operation. Several sequences may be required to cover the entire pattern and re-coating of the laser shock peened surfaces 54 is done between each sequence of laser firings wherein each spot 58 is hit several times. The laser firing has multiple laser firings or pulses with a period between firings that is often referred to a "rep". During the rep the part is moved so that the next pulse occurs at the location of the next laser shocked peened circular spot 58. Preferably the part is moved continuously and timed to be at the appropriate location at the pulse or firing of the laser beam. One or more repeats of the sequence may be used to hit each laser shocked peened circular spot 58 more than once. This may also allow for less laser power to be used in each firing or laser pulse.

One example of the present invention is a fan blade 8 having an airfoil about 11 inches long, a chord C about 3.5 inches, and laser shock peened surfaces 54 about 2 inches long along the leading edge LE. The laser shock peened surfaces 54 are about 0.5 inches wide (W1). Three sequences of coating and continuous laser firings and blade movement are used. The firings between reps of the laser are done on spots 58 which lie on unabated coated surfaces which requires a recoat between each of the sequences. Each spot 58 is hit three times and therefore three sets of sequences are used for a total three coat and recoats of the laser shock peened surface 54. This is relatively few as opposed to as many as twelve coats and recoat if four different sequences had to be used 3 times in order to provide a continuous laser shock peened region as taught in the prior art while still always hitting virgin material.

The laser shock peening process starts with first coating the surface 54 and laser shock peening the first sequence in which every spot is laser shock peened once, preferably using on the fly wherein the blade is continuously moved and the laser beam is continuously fired or pulsed. The part is timed to move between adjacent laser shock peened spots in the given sequence. The timing coincides with the rep between the pulses of the continuous laser firing on the blade. All rows of the overlapping laser shocked peened circular spots 58 contain spots of each sequence spaced apart a distance so that other laser shock peened circular spots of the same sequence don't effect the coating around it. In between firings the entire area of the laser shock peened surfaces 54 to be laser shock peened is coated. The recoating steps avoid any of the bare metal of the laser shock peened surface from being hit directly with the laser beam. It has also been found desirable to laser shock peen each spot 58 up to 3 or more times.

It has been found that the part can be laser shock peened without any coating using on the fly laser shock peening which saves a considerable amount of time by not having to recoat. Furthermore, since it is often desired to laser shock peen each surface more than once and, in particular, three times. It is possible to save coating of the surface by laser shock peening without any coating at all. The plasma that is created is made up of the metal alloy material of the blade or part itself. In such a case, a remelt will be left on the laser shock peened area after the laser shock peening or pulsing part of the process is completed. This remelt will usually have to be removed in any one of many well known processes such as by mechanical or chemical removing of the layer. The usefulness of a non-coated part with on the fly laser shock peening will depend on the thickness of the part and careful attention must particularly be given to thin airfoil leading and trailing edges. It should be noted that the plasma and the metal alloy without coat rehardens and forms what is known as a remelt and therefore will require a removal in one of the well known fashions.

Referring more specifically to FIGS. 2–3, the present invention includes laser shock peening either the leading edge LE or the trailing edge TE sections or both the leading edge LE and the trailing edge TE sections of the fan blade 8 to produce laser shock peened surfaces 54 and associated array 56 of pre-stressed volumetrically spaced apart laser shock peened protrusions 53 with deep compressive residual stresses imparted by laser shock peening (LSP) as disclosed above. The laser shocked surface and associated pre-stressed region on the trailing edge TE section is constructed similarly to the leading edge LE section as described above. Nicks on the leading edge LE tend to be larger than nicks on the trailing edge TE and therefore the first width W1 of the leading edge section 50 may be greater than a second width W2 of the trailing edge section 70 which may also be laser shock peened. By way of example W1 may be about 0.5 inches and W2 may be about 0.25 inches. Referring again to FIG. 2A it may be desirable to laser shock peen only a portion L1 of the LE to TE instead of its entire length as shown in FIG. 2.

FIG. 2A illustrates the invention for a partial leading edge length L1 of the array 56 of pre-stressed volumetrically spaced apart laser shock peened protrusions 53 extending over the laser shock peened surface length L1 of the leading edge LE that is generally centered about a predetermined nodal line 59 where it intercepts the leading edge LE. Preferably, the nodal line 59 is one of a dominant failure mode due to vibratory stress. This stress may be due to excitations of the blade in bending and torsional flexure modes. The dominant failure mode may not always be the maximum stress mode but rather a lower stress mode or combination of modes that exist for longer durations over the engine's mission. By way of example the predetermined nodal line 59 illustrated in FIG. 2A is due to a first flex mode. A nick 52 located in this area of the leading edge LE has the greatest potential for failing the blade under resonance in this mode. Further by way of example, the laser shock peened surface length L1 is a partial length of the leading edge and contains the pre-stressed laser shock peened protrusions 53 in the array 56 which may extend along the leading edge LE about 20% of the fan blade length from the tip 38 to the platform 36.

The present invention uses laser beams with lower energies than has yet been disclosed and these beams can be produced using different laser materials such as neodymium doped yttrium aluminum garnet (Nd:YAG), Nd:YLF, and others. The advantage of these lower energy lasers is that they can pulse at significantly higher rates, several pulses per second and they are off-the-shelf lasers presently available from commercial vendors.

By way of example: for a comparable 200 Joules/cm$^2$ surface energy density, a 50 J high energy laser produces a pulse every 4 seconds and covers an area of 0.25 cm$^2$ per pulse. A 3 Joule low energy laser, such as that of the present invention, produces 10 pulses per second and covers an area of 0.015 cm$^2$. The result is an area 16.7 times smaller than the high energy pulse, but the 3 Joule low energy laser has a pulsing rate 40 times that of the higher energy laser. The net effect is a 2.4 times improvement in the overall area coverage in a given time period of laser shock peening using the lower energy laser.

One particularly useful type of laser is an Excimer type laser which use gaseous mediums that lase in the ultraviolet regime. These lasers deliver the nanosecond pulse durations and are currently approaching 10 J per pulse, and have the potential to impact throughput that is significant at either small or medium spot sizes on the laser shock peened surface. Furthermore, the ultraviolet radiation interaction with hard aircraft engine alloys involves less thermal transport and is analogous to an ablation process wherein material is detached from the lattice structure versus melting and vaporization. This feature can be significant in laser shock peening process where surface damage (melting and resolidification) can more than offset any improved characteristics imparted from the laser shock peening process. The ultraviolet radiation may minimize or eliminate the need for external coatings to protect the surface which are currently believed to be required for Nd:Glass laser shock peening.

Another advantage of using low energy lasers is that they are typically more robust industrial tools. Typically, a maintenance cycle for a low energy lamp pumped laser may be in excess of one million pulses and can approach tens of millions of pulses. A typical maintenance cycle for the high energy laser is about tens of thousands of shots, approaching 50 thousand. Thus, factoring in the 16.7 times the number of pulse required for the low energy laser and a conservative maintenance cycle of 10 million pulses versus a 50 thousand pulse maintenance cycle for the high energy laser, the low energy laser should require service less often than the high power laser, perhaps by a factor of 10.

Another advantage of the low energy laser that is more difficult to factor is the complexity of the system. The low energy laser will have three or four small laser heads, 6 or 8 flash lamps and comparably smaller power supplies. The high energy laser may have a minimum of 5 heads, four of which will be relatively large and correspondingly large power supplies and 10 to 18 flash lamps. Some high energy lasers disclosed elsewhere, have as many as 14 heads, 10 large power supplies, and will exceed 40 flash lamps (a high maintenance item in any laser system). Any laser process depends on the successful functioning of all elements of the system: heads, lamps, power supplies and controllers. The sheer number of wearable parts in the high energy lasers and the long term number of pulses required to process large quantities of components, make the reliability of the high energy laser suspect, relative to the less complex low energy laser.

Another advantage of the low energy laser is cost and delivery. The low energy laser can be procured in approximately 90 days from one of several vendors and costs approximately $100,000. A typical LSP system might require two low energy lasers for a total cost of $200,000. The high energy lasers cost in excess of $1,000,000 and can approach $4,000,000 and require over 6 months and sometimes over a year to acquire. Being specialized designs, the high energy lasers require specialized spare parts that can also require long lead time items and are more expensive.

While the preferred embodiment of the present invention has been described fully in order to explain its principles, it is understood that various modifications or alterations may be made to the preferred embodiment without departing from the scope of the invention as set forth in the appended claims.

We claim:

1. A method of laser shock peening a hard metallic article, said method comprising the following steps:

firing a laser beam on different points of a laser shock peened surface on at least a portion of the article, using a laser beam with sufficient power to vaporize material on the surface around laser beam spots formed by the laser beam at the points on the surface, flowing a curtain of water over the surface upon which the laser beam is firing, and firing the laser beam so as to form a plurality of volumetrically spaced apart laser shock peened protrusions extending into the article from the spots such that the protrusions have deep compressive residual stresses imparted by laser the laser beam.

2. A method as claimed in claim 1 wherein the surface is coated with an ablative material which the laser beam vaporizes.

3. A method as claimed in claim 2 wherein the plurality includes at least one array of protrusions extending inward into the article from equidistantly spaced apart circular laser beam spots.

4. A method as claimed in claim 3 wherein the method is an on the fly method of laser shock peening further comprising continuously moving the article while continuously firing a stationary laser beam, which repeatably pulses between relatively constant periods.

5. A method as claimed in claim 2 further comprising using a laser beam having a power of about between 3–10 joules and forming laser beam spots having a diameter of about 1 mm.

6. A method as claimed in claim 5 further comprising using a temporal profile of each pulse having a duration in a range of about 20 to 30 nanoseconds and a rise time less than about 10 nanoseconds.

7. A method as claimed in claim 6 wherein the rise time is about 4 nanoseconds and the power of the laser is about 3 joules.

8. A method as claimed in claim 6 wherein:
the article is a gas turbine engine blade having a leading edge and a trailing edge,
the portion of the article is one of the edges, and
the laser shock peened surface extends radially along at least a part of one of the edges.

9. A method as claimed in claim 8 further comprising simultaneously laser shock peening two laser shock peened surfaces each of which is on one of two sides of the blade continuously moving the blade while continuously firing using two stationary ones of the laser beam on the portion of the blade, using the laser beams to vaporize material on the two surfaces of the portion of the blade with the pulses around the laser beam spots formed by the laser beam on the surfaces to form protrusions having deep compressive residual stresses extending into the blade from the laser shock peened surfaces, and flowing a curtain of water over the surfaces upon which the laser beam is firing while moving the blade.

10. A method as claimed in claim 9 wherein the blade is moved linearly to produce at least one row of non-overlapping equidistantly spaced apart circular laser beam spots having generally equally spaced apart linearly aligned center points.

11. A method as claimed in claim 10 wherein the blade is moved and the laser beam is fired to produce more than one row of the circular laser beam spots having generally equally spaced apart linearly aligned center points wherein adjacent rows of spots do not overlap.

12. A method as claimed in claim 10 wherein the laser beams are fired and the blade moved so that the center points of adjacent spots in adjacent rows are offset from each other a generally equal amount in a direction along a line on which the center points are linearly aligned.

13. A method as claimed in claim 10 wherein the laser beams are fired from an excomer type laser which use a gaseous medium that lase in the ultraviolet regime.

14. A method as claimed in claim 10 wherein the laser beams are fired from a neodymium doped yttrium aluminum garnet (Nd:YAG) laser.

* * * * *